United States Patent
Yasumiishi et al.

(10) Patent No.: US 9,960,426 B2
(45) Date of Patent: May 1, 2018

(54) ELECTRODE MATERIAL FOR LITHIUM-ION SECONDARY BATTERY, METHOD FOR MANUFACTURING SAME, ELECTRODE FOR LITHIUM-ION SECONDARY BATTERY, AND LITHIUM-ION SECONDARY BATTERY

(71) Applicant: SUMITOMO OSAKA CEMENT CO., LTD., Tokyo (JP)

(72) Inventors: Hirofumi Yasumiishi, Tokyo (JP); Ryuuta Yamaya, Tokyo (JP)

(73) Assignee: SUMITOMO OSAKA CEMENT CO., LTD. (JP)

( * ) Notice: Subject to any disclaimer, the term of this patent is extended or adjusted under 35 U.S.C. 154(b) by 0 days. days.

(21) Appl. No.: 15/470,337

(22) Filed: Mar. 27, 2017

(65) Prior Publication Data

US 2018/0097232 A1 Apr. 5, 2018

(30) Foreign Application Priority Data

Sep. 30, 2016 (JP) ................................. 2016-192875

(51) Int. Cl.
| | |
|---|---|
| *H01M 4/58* | (2010.01) |
| *H01M 10/0525* | (2010.01) |
| *H01M 4/04* | (2006.01) |
| *H01M 4/36* | (2006.01) |
| *H01M 4/62* | (2006.01) |
| *H01M 4/136* | (2010.01) |
| *H01M 4/1397* | (2010.01) |
| *H01M 4/02* | (2006.01) |

(52) U.S. Cl.
CPC ....... *H01M 4/5825* (2013.01); *H01M 4/0402* (2013.01); *H01M 4/0471* (2013.01); *H01M 4/136* (2013.01); *H01M 4/1397* (2013.01); *H01M 4/366* (2013.01); *H01M 4/625* (2013.01); *H01M 10/0525* (2013.01); *H01M 2004/028* (2013.01)

(58) Field of Classification Search
None
See application file for complete search history.

(56) References Cited

FOREIGN PATENT DOCUMENTS

| JP | 2012-204015 A | 10/2012 |
|---|---|---|
| JP | 2013-535761 A | 9/2013 |

OTHER PUBLICATIONS

Notice of Allowance for Japanese Patent Application No. 2016-192875 (dated May 30, 2017).

*Primary Examiner* — Sarah A. Slifka
(74) *Attorney, Agent, or Firm* — Merchant & Gould P.C.

(57) ABSTRACT

An electrode material for a lithium-ion secondary battery of the present invention is secondary particles including inorganic particles represented by General Formula $LiFe_xMn_{1-x-y}M_yPO_4$ and a carbonaceous film coating surfaces of the inorganic particles, in which an amount of carbon is 0.5% by mass to 2.5% by mass, a specific surface area is 10 $m^2/g$ to 20 $m^2/g$, a first particle diameter (D90(a)) at which a cumulative volume percentage of a particle size distribution of secondary particles is 90% before an ultrasonic treatment is 20 mm to 40 mm, a second particle diameter (D90(b)) at which the cumulative volume percentage of the particle size distribution of the secondary particles is 90% after the ultrasonic treatment is 10 mm to 15 mm, and a ratio (D90(b)/D90(a)) of the second particle diameter (D90(b)) to the first particle diameter (D90(a)) is 0.3 to 0.5.

5 Claims, No Drawings

US 9,960,426 B2

ELECTRODE MATERIAL FOR LITHIUM-ION SECONDARY BATTERY, METHOD FOR MANUFACTURING SAME, ELECTRODE FOR LITHIUM-ION SECONDARY BATTERY, AND LITHIUM-ION SECONDARY BATTERY

CROSS-REFERENCE TO RELATED APPLICATIONS

This application claims the benefit of Japanese Patent Application No. 2016-192875 filed Sep. 30, 2016, the disclosure of which is herein incorporated by reference in its entirety.

BACKGROUND OF THE INVENTION

Field of the Invention

The present invention relates to an electrode material for a lithium-ion secondary battery, a method for manufacturing the same, an electrode for a lithium-ion secondary battery, and a lithium-ion secondary battery.

Description of Related Art $LiFe_xMn_{1-x-y}M_yPO_4$ which is an olivine-based electrode active material has insufficient electron conductivity. Therefore, in lithium-ion secondary batteries in which a phosphate-based electrode active material is used as an electrode active material, a variety of efforts are made for miniaturization of electrode active material particles, conjugation of an electrode active material and a conductive substance such as carbon, and the like in order to charge and discharge a large amount of electric current (for example, refer to Japanese Laid-open Patent Publication No. 2012-204015).

Fine and non-granular olivine-based electrode active materials have a high surface energy of the primary particles and are thus likely to agglomerate. Therefore, in a case in which electrode material paste including an olivine-based electrode active material is prepared, the olivine-based electrode active material is likely to agglomerate. When electrodes are produced using the above-described electrode material paste, the electrode structures are likely to become uneven. Therefore, in the related art, during the preparation of electrode material paste, the cracking intensity of olivine-based electrode active materials is adjusted or the amount of carbon (the amount of carbon constituting a carbonaceous film that coats the surface of the olivine-based electrode active materials) is adjusted, thereby suppressing the agglomeration of the olivine-based electrode active materials.

An increase in the amount of carbon enables the suppression of the agglomeration of olivine-based electrode active materials. However, when the amount of carbon is too large, the ion resistance of olivine-based electrode active materials increases.

In addition, when the cracking intensity of olivine-based electrode active materials decreases, it is possible to suppress the agglomeration of olivine-based electrode active materials while suppressing the damaging of carbonaceous films. However, when the cracking intensity of olivine-based electrode active materials is too low, it is not possible to sufficiently crack olivine-based electrode active materials. Therefore, when electrodes are produced using an olivine-based electrode active material which is not sufficiently cracked, the electrode structure becomes uneven.

SUMMARY OF THE INVENTION

The present invention has been made in consideration of the above-described circumstances, and an object of the present invention is to provide an electrode material for a lithium-ion secondary battery having improved dispersibility of an electrode active material, a method for manufacturing the same, an electrode for a lithium-ion secondary battery, and a lithium-ion secondary battery.

The present inventors and the like carried out intensive studies in order to achieve the above-described object, consequently found that, in an electrode material for a lithium-ion secondary battery formed by coating the surfaces of inorganic particles represented by General Formula $LiFe_xMn_{1-x-y}M_yPO_4$ with a carbonaceous film, when the particle diameters at which the cumulative volume percentage of the particle size distribution of secondary particles is 90% before and after an ultrasonic treatment and the ratio between these two particle diameters are set in predetermined ranges, the following things are followed, and completed the present invention. That is, it was found that the dispersibility of electrode active materials increases and it is possible to increase the power of lithium-ion secondary batteries.

An electrode material for a lithium-ion secondary battery of the present invention is secondary particles including inorganic particles represented by General Formula $LiFe_xMn_{1-x-y}M_yPO_4$ (here, M represents at least one element selected from Mg, Ca, Co, Sr, Ba, Ti, Zn, B, Al, Ga, In, Si, Ge, and rare earth elements, $0.05 \le x \le 1.0$, $0 \le y \le 0.14$, and $0 \le 1-x-y$) and a carbonaceous film that coats surfaces of the inorganic particles, in which an amount of carbon is 0.5% by mass or more and 2.5% by mass or less, a specific surface area is 10 $m^2/g$ or more and 20 $m^2/g$ or less, a first particle diameter (D90(a)) at which a cumulative volume percentage of a particle size distribution of secondary particles is 90% before an ultrasonic treatment is 20 μm or more and 40 μm or less, a second particle diameter (D90(b)) at which the cumulative volume percentage of the particle size distribution of the secondary particles is 90% after the ultrasonic treatment is 10 μm or more and 15 μm or less, and a ratio (D90(b)/D90(a)) of the second particle diameter (D90(b)) to the first particle diameter (D90(a)) is 0.3 or more and 0.5 or less.

An electrode for a lithium-ion secondary battery of the present invention includes the electrode material for a lithium-ion secondary battery of the present invention.

A lithium-ion secondary battery of the present invention includes a cathode; an anode; and a non-aqueous electrolyte, and the cathode is the electrode for a lithium-ion secondary battery of the present invention.

A method for manufacturing an electrode material for a lithium-ion secondary battery of the present invention is a method for manufacturing the electrode material for a lithium-ion secondary battery of the present invention and includes a step of synthesizing $LiFe_xMn_{1-x-y}M_yPO_4$ particles under pressure by heating raw material slurry α obtained by mixing an Li source, a Fe source, an Mn source, a P source, and an M source with a solvent including water as a main component; and a step of coating surfaces of the $LiFe_xMn_{1-x-y}M_yPO_4$ particles with a carbonaceous film by drying raw material slurry β formed by dispersing the $LiFe_xMn_{1-x-y}M_yPO_4$ particles in a water solvent including a carbon source so as to granulate the slurry, then, preliminarily calcinating the granulated body so as to pulverize the granulated body, and then heating the pulverized body.

According to the present invention, it is possible to provide an electrode material for a lithium-ion secondary battery having improved dispersibility of an electrode active material, a method for manufacturing the same, an electrode for a lithium-ion secondary battery, and a lithium-ion secondary battery.

DETAILED DESCRIPTION OF THE INVENTION

An embodiment of the electrode material for a lithium-ion secondary battery, the method for manufacturing the same, the electrode for a lithium-ion secondary battery, and the lithium-ion secondary battery of the present invention will be described.

Meanwhile, the present embodiment is a specific description for easier understanding of the gist of the present invention and, unless particularly otherwise described, does not limit the present invention.

Electrode Material for Lithium-Ion Secondary Battery

An electrode material for a lithium-ion secondary battery of the present embodiment is secondary particles including inorganic particles represented by General Formula $LiFe_xMn_{1-x-y}M_yPO_4$ (here, M represents at least one element selected from Mg, Ca, Co, Sr, Ba, Ti, Zn, B, Al, Ga, In, Si, Ge, and rare earth elements, $0.05 \leq x \leq 1.0$, $0 \leq y \leq 0.14$, and $0 \leq 1-x-y$) and a carbonaceous film that coats the surfaces of the inorganic particles, in which the amount of carbon is 0.5% by mass or more and 2.5% by mass or less, the specific surface area is 10 $m^2/g$ or more and 20 $m^2/g$ or less, the first particle diameter (D90(a)) at which the cumulative volume percentage of the particle size distribution of secondary particles is 90% before an ultrasonic treatment is 20 μm or more and 40 μm or less, the second particle diameter (D90(b)) at which the cumulative volume percentage of the particle size distribution of the secondary particles is 90% after the ultrasonic treatment is 10 μm or more and 15 μm or less, and the ratio (D90(b)/D90(a)) of the second particle diameter (D90(b)) to the first particle diameter (D90(a)) is 0.3 or more and 0.5 or less.

The electrode material for a lithium-ion secondary battery of the present embodiment is formed by coating the surfaces of the primary particles of an electrode active material made of $LiFe_xMn_{1-x-y}M_yPO_4$ with a carbonaceous film.

The average primary particle diameter of the primary particles of the electrode active material made of $LiFe_xMn_{1-x-y}M_yPO_4$ is preferably 30 nm or more and 500 nm or less and more preferably 50 nm or more and 400 nm or less.

Here, the reasons for setting the average primary particle diameter of $LiFe_xMn_{1-x-y}M_yPO_4$ particles in the above-described range are as described below. When the average primary particle diameter of the $LiFe_xMn_{1-x-y}M_yPO_4$ particles is less than 30 nm, the particles become too fine, and it becomes difficult to favorably maintain the crystallinity. On the other hand, when the average primary particle diameter of the $LiFe_xMn_{1-x-y}M_yPO_4$ particles exceeds 500 nm, the $LiFe_xMn_{1-x-y}M_yPO_4$ particles are not sufficiently miniaturized, and consequently, extremely fine $LiFe_xMn_{1-x-y}M_yPO_4$ particles having favorable crystallinity cannot be obtained.

The secondary particles which are an agglomerate of particles formed by coating the surfaces of the primary particles of the electrode active material with the carbonaceous film preferably has a first particle diameter (D90(a)) at which the cumulative volume percentage of the particle size distribution of the secondary particles is 90% before an ultrasonic treatment that is 20 μm or more and 40 μm or less and preferably 25 μm or more and 35 μm or less.

The reasons for setting the first particle diameter (D90(a)) at which the cumulative volume percentage of the particle size distribution of the secondary particles is 90% before an ultrasonic treatment in the above-described range are as described below. When the first particle diameter (D90(a)) is less than 20 μm, the frequency of fine particles is high, and thus it is difficult for conductive auxiliary agents and binding agents to disperse in high-concentration liquid during the preparation of electrode paste. On the other hand, when the first particle diameter (D90(a)) exceeds 40 μm, the agglomeration degree is high, and the particles are not disentangled during the preparation of electrode paste, and thus the particles are present in electrodes as coarse agglomerates.

In addition, the secondary particles which are an agglomerate of particles formed by coating the surfaces of the primary particles of the electrode active material with the carbonaceous film preferably has a second particle diameter (D90(b)) at which the cumulative volume percentage of the particle size distribution of the secondary particles is 90% after an ultrasonic treatment that is 10 μm or more and 15 μm or less and preferably 11 μm or more and 14 μm or less.

The reasons for setting the second particle diameter (D90(b)) at which the cumulative volume percentage of the particle size distribution of the secondary particles is 90% before an ultrasonic treatment in the above-described range are as described below. When the second particle diameter (D90(a)) is less than 10 μm, similar to the first particle diameter (D90(a)), the frequency of fine particles is high, and thus it is difficult for conductive auxiliary agents and binding agents to disperse in high-concentration liquid during the preparation of electrode paste. On the other hand, when the first particle diameter (D90(a)) exceeds 15 μm, similar to the first particle diameter (D90(a)), the agglomeration degree is high, and the particles are not disentangled during the preparation of electrode paste, and thus the particles are present in electrodes as coarse agglomerates.

The ultrasonic treatment for the electrode material for a lithium-ion secondary battery of the present embodiment is carried out in an ultrasonic dispersion step in a circulation system of a particle size distribution analyzer LA-950V2 manufactured by Horiba Ltd. The ultrasonic intensity is controlled using software, and the ultrasonic treatment is carried out with the intensity, which can be set in a range of 0 to 10, set to 4. The presence or absence of the ultrasonic treatment is applied as a method for evaluating the ease of the disentanglement of the electrode material for a lithium-ion secondary battery of the present embodiment.

The particle size distribution of the electrode material for a lithium-ion secondary battery of the present embodiment is measured, for example, in the ultrasonic dispersion step in the circulation system of the particle size distribution analyzer LA-950V2 manufactured by Horiba Ltd. The stirring rate in a dispersion cell is set to 6 in the measurement.

Furthermore, the ratio (D90(b)/D90(a)) of the second particle diameter (D90(b)) at which the cumulative volume percentage of the particle size distribution of secondary particles is 90% after the ultrasonic treatment to the first particle diameter (D90(a)) at which the cumulative volume percentage of the particle size distribution of secondary particles is 90% before the ultrasonic treatment is 0.3 or more and 0.5 or less and preferably 0.35 or more and 0.45 or less.

The reasons for setting the ratio (D90(b)/D90(a)) of the second particle diameter (D90(b)) to the first particle diameter (D90(a)) in the above-described range are as described below. When D90(b)/D90(a) is less than 0.3, the agglomeration structure is quickly disentangled during the preparation of electrode paste. It is preferable to slowly disentangle the agglomeration by slowly decreasing the paste viscosity in a state in which a shear force is added thereto during the preparation of electrode paste since the cutting or the like of conductive auxiliary agents is prevented. On the other hand, when D90(b)/D90(a) exceeds 0.5, the agglomeration is not easily disentangled even when a shear force is added thereto during the preparation of electrode paste, and coarse agglomerated particles are present in electrodes.

The thickness of the carbonaceous film is preferably 1 nm or more and 5 nm or less.

The reasons for setting the thickness of the carbonaceous film in the above-described range are as described below. When the thickness of the carbonaceous film is less than 1 nm, the thickness of the carbonaceous film is too thin, and it becomes impossible to form a film having a desired resistance value. As a result, the conductivity decreases, and it becomes impossible to ensure conductivity suitable for electrode materials. On the other hand, when the thickness of the carbonaceous film exceeds 5 nm, battery activity, for example, the battery capacity of the electrode material per unit mass, decreases.

The coating ratio of the carbonaceous film to the inorganic particles is preferably 60% or more and 95% or less and more preferably 80% or more and 95% or less. When the coating ratio of the carbonaceous film is 60% or more, the coating effect of the carbonaceous film can be sufficiently obtained.

The shape of the secondary particle of the electrode active material made of $LiFe_xMn_{1-x-y}M_yPO_4$ which is coated with the carbonaceous film is not particularly limited, but is preferably a spherical shape since it is easy to generate an electrode material made of spherical particles, particularly, truly spherical particles.

Here, the reasons for the shape being preferably a spherical shape are as described below. It is possible to decrease the amount of a solvent when the secondary particles of the electrode active material which are coated with the carbonaceous film, a binding agent, and the solvent are mixed together so as to prepare electrode material paste for a lithium-ion secondary battery. Furthermore, it also becomes easy to apply the electrode material paste for a lithium-ion secondary battery to the electrode current collector. In addition, when the shape of the secondary particle is a spherical shape, the surface area of the secondary particles of the electrode active material which are coated with the carbonaceous film is minimized, furthermore, it is possible to minimize the mixing amount of the binding agent being added, and the internal resistance of electrodes to be obtained can be decreased.

Furthermore, when the shape of the secondary particle of the electrode active material which is coated with the carbonaceous film is set to be a spherical shape, particularly, a truly spherical shape, it becomes easy to closely pack the primary particles. In such a case, the amount of the electrode material for a lithium-ion secondary battery packed per unit volume increases, consequently, an electrode density can be increased, and it is possible to increase the capacity of the lithium-ion secondary battery, which is preferable.

The amount of carbon included in the electrode material for a lithium-ion secondary battery of the present embodiment is 0.5% by mass and 2.5% by mass or less and preferably 0.7% by mass or more and 2.0% by mass.

Here, the reasons for limiting the amount of carbon included in the electrode material for a lithium-ion secondary battery of the present embodiment in the above-described range are as described below. When the amount of carbon is less than 0.5% by mass, the discharge capacity at a high charge-discharge rate is decreased in a case in which a battery is formed, and it becomes difficult to realize sufficient charge and discharge rate performance. On the other hand, when the amount of carbon exceeds 2.5% by mass, the amount of carbon is too large, and the battery capacity of a lithium-ion secondary battery per unit mass of the primary particles of the electrode active material decreases more than necessary.

The specific surface area of the electrode material for a lithium-ion secondary battery of the present embodiment is 10 $m^2$/g or more and 20 $m^2$/g or less and preferably 12 $m^2$/g or more and 15 $m^2$/g or less.

Here, the reasons for limiting the specific surface area of the electrode material for a lithium-ion secondary battery of the present embodiment in the above-described range are as described below. When the specific surface area is less than 10 $m^2$/g, it takes time for lithium ions or electrons to migrate in the electrode material for a lithium-ion secondary battery, and thus internal resistance increases, and output characteristics deteriorate, which is not preferable. On the other hand, the specific surface area exceeds 20 $m^2$/g, the specific surface area of the electrode material for a lithium-ion secondary battery increases, and thus the mass of necessary carbon increases, and the charge and discharge capacity decreases, which is not preferable.

For the electrode material for a lithium-ion secondary battery of the present embodiment, N-methyl-2-pyrrolidone (NMP) is used as a solvent, and the traverse relaxation time measured using a nuclear magnetic resonance method is preferably 40 ms or more and 400 ms or less and more preferably 60 ms or more and 350 ms or less.

Here, in the electrode material for a lithium-ion secondary battery of the present embodiment, the reasons for using N-methyl-2-pyrrolidone (NMP) as a solvent and limiting the traverse relaxation time measured using a nuclear magnetic resonance (NMR) method to the above-described range are as described below. When the traverse relaxation time is shorter than 40 ms, the coating ratio of the carbonaceous film to the inorganic particles is too high, and the ion conductivity becomes poor. On the other hand, when the traverse relaxation time exceeds 400 ms, the agglomeration degree of agglomerated particles is high, coarse agglomerated particles are present during the preparation of electrode paste, and coarse agglomerated particles are present in electrodes.

For the electrode material for a lithium-ion secondary battery of the present embodiment, a method for measuring the traverse relaxation time using the nuclear magnetic resonance method is, for example, as described below.

The electrode material for a lithium-ion secondary battery which is a specimen (0.01 g) is weighed in a screw tube having a capacity of 30 mL, N-methyl-2-pyrrolidone (10 g) is added thereto, and then an ultrasonic treatment is carried out for five minutes using an ultrasonic cleaning machine, thereby preparing a dispersion liquid including the electrode material for a lithium-ion secondary battery. The obtained dispersion liquid is collected into an NMR tube, and the traverse relaxation time of the electrode material for a lithium-ion secondary battery is measured using a nuclear magnetic resonance device (trade name: Acorn Area, manufactured by Xigo Nanotools).

Electrode Active Material

The electrode active material is made of $LiFe_xMn_{1-x-y}M_yPO_4$ (here, M represents at least one element selected from Mg, Ca, Co, Sr, Ba, Ti, Zn, B, Al, Ga, In, Si, Ge, and rare earth elements, $0.05 \leq x \leq 1.0$, $0 \leq y \leq 0.14$, and $0 \leq 1-x-y$) having a crystal structure preferable for Li diffusion.

In $LiFe_xMn_{1-x-y}M_yPO_4$, the reasons for setting x to satisfy $0.05 \leq x \leq 1.0$ are as described below. Since Fe develops a charge and discharge capacity at a voltage of near 3.5 V, a decrease in the energy density caused by formation of a solid solution is milder than that of Co or Zn, and thus a relatively large amount of Fe has been set to be available for formation of a solid solution so that an improvement of low-temperature characteristics is expected while the energy density is not excessively decreased. Furthermore, Fe is a carbonization catalyst element and, when forming a Fe solid solution, improves the coating properties of the carbonaceous film and thus enables an improvement of output characteristics or low-temperature characteristics. Therefore, the amount of a solid solution at which a sufficient carbonization catalyst action can be developed has been set as a solid solution range.

The reasons for setting y to satisfy $0 \leq y \leq 0.14$ are as described below. Co or Zn is an electrochemical inert element in a voltage range of 1.0 V to 4.3 V and has a strong effect of improving electron conductivity, Li diffusivity, and the activation energy for an intercalation and deintercalation reaction of a lithium ion (Li+). However, a large amount of a solid solution formed significantly decreases the charge and discharge capacity and the energy density, and thus a relatively small amount of Co or Zn at which low-temperature characteristics can be sufficiently improved while the energy density is not excessively decreased has been set to be allowed to form a solid solution.

In $LiFe_xMn_{1-x-y}M_yPO_4$, M is an electrochemical inert element in a voltage range of 1.0 V to 4.3 V. The electrochemical inert element in a voltage range of 1.0 V to 4.3 V is, specifically, preferably an element which constitutes lithium-ion secondary batteries, have a valence that remains unchanged even in a case in which the voltage is changed in a range of 1.0 V to 4.3 V, and does not contribute to the development of charge and discharge capacities.

Examples of the M include at least one element selected from Mg, Ca, Co, Sr, Ba, Ti, Zn, B, Al, Ga, In, Si, Ge, and rare earth elements. That is, as M, the above-described elements may be singly used or a combination (mixture) of two or more elements may be used.

In $LiFe_xMn_{1-x-y}M_yPO_4$ in the present embodiment, M is preferably Mg or Co and more preferably a mixture of Mg and Co. In a case in which M is a mixture of Mg and Co, the y preferably satisfies $0.01 \leq y \leq 0.075$ and more preferably satisfies $0.03 \leq y \leq 0.06$.

In the electrode material for a lithium-ion secondary battery of the present embodiment, the discharge capacity of $LiFe_xMn_{1-x-y}M_yPO_4$ at an electric current density of 10CA, which is measured at 25° C., is preferably 80 mAh/g or more and more preferably 85 mAh/g or more.

Here, the reasons for setting the discharge capacity in the above-described range are as described below. When the discharge capacity is less than 80 mAh/g, the output of the battery becomes insufficient, and the battery becomes inappropriate for a high-output battery.

Meanwhile, the discharge capacity (mAh/g) at a current density 10CA of $LiFe_xMn_{1-x-y}M_yPO_4$ is measured using a method described in the examples.

Method for Manufacturing Electrode Material for Lithium-Ion Secondary Battery

A method for manufacturing an electrode material for a lithium-ion secondary battery of the present embodiment is not particularly limited, and examples thereof include a method including a step of synthesizing $LiFe_xMn_{1-x-y}M_yPO_4$ particles under pressure by heating raw material slurry α obtained by mixing an Li source, a Fe source, an Mn source, a P source, and an M source with a solvent including water as a main component to a temperature in a range of 150° C. to 230° C. and a step of coating the surfaces of the $LiFe_xMn_{1-x-y}M_yPO_4$ particles (primary particles) with a carbonaceous film by drying raw material slurry β formed by dispersing the $LiFe_xMn_{1-x-y}M_yPO_4$ particles in a water solvent including a carbon source so as to granulate the slurry, then, preliminarily calcinating the granulated body by means of heating at 250° C. so as to pulverize the granulated body, and then calcinating the pulverized body at a temperature in a range of 550° C. or higher and 830° C. or lower.

A device being that is used for the pulverization of the granulated body does not need to completely pulverize the granulated body, but needs to be capable of cracking part of the granulated body, and it is possible to use, for example, air flow-type fine pulverizers such as a dry-type ball mill, a wet-type ball mill, a mixer and a jet mill, ultrasonic crushers, and the like.

The method for synthesizing the $LiFe_xMn_{1-x-y}M_yPO_4$ particles is not particularly limited, and, for example, an Li source, a Fe source, an Mn source, a P source, and an M (at least one element selected from Mg, Ca, Co, Sr, Ba, Ti, Zn, B, Al, Ga, In, Si, Ge, and rare earth elements) source are injected into a solvent including water as a main component and stirred, thereby preparing raw material slurry α including the precursor of $LiFe_xMn_{1-x-y}M_yPO_4$.

The Li source, the Fe source, the Mn source, the P source, and the M source are injected into a solvent including water as a main component so that the molar ratio therebetween (the Li source:the Fe source:the Mn source:the P source:the M source), that is, the molar ratio of Li:Fe:Mn:P:M reaches 2 to 3.5:0.05 to 1:0 to 0.95:0.95 to 1.07:0 to 0.14, and are stirred and mixed, thereby preparing the raw material slurry α.

The Li source, the Fe source, the Mn source, the P source, and the M source are preferably, first, put into an aqueous solution state respectively and then are mixed together in order to uniformly mix the Li source, the Fe source, the Mn source, the P source, and the M source.

The molar concentration of the Li source, the Fe source, the Mn source, the P source, and the M source in the raw material slurry α is preferably in a range of 1 mol/L to 4 mol/L since it is necessary to obtain extremely small $LiFe_xMn_{1-x-y}M_yPO_4$ particles having a high purity and high crystallinity.

Examples of the Li source include hydroxides such as lithium hydroxide (LiOH), inorganic lithium acid salts such as lithium carbonate ($Li_2CO_3$), lithium chloride (LiCl), lithium nitrate ($LiNO_3$), lithium phosphate ($Li_3PO_4$), lithium hydrogen phosphate ($Li_2HPO_4$), and lithium dihydrogen phosphate ($LiH_2PO_4$), organic lithium acid salts such as lithium acetate ($LiCH_3COO$) and lithium oxalate (($COOLi)_2$), and hydrates thereof. As the Li source, at least one compound selected from the above-described group is preferably used.

Meanwhile, lithium phosphate ($Li_3PO_4$) can also be used as the Li source and the P source.

As the Fe source, iron compounds such as iron (II) chloride ($FeCl_2$), iron (II) sulfate ($FeSO_4$), and iron (II) acetate ($Fe(CH_3COO)_2$) or hydrates thereof, trivalent iron compounds such as iron (III) nitrate ($Fe(NO_3)_3$), iron (III) chloride ($FeCl_3$), and iron (III) citrate ($FeC_6H_5O_7$), lithium iron phosphate, or the like can be used.

The Mn source is preferably an Mn salt, and examples thereof include manganese (II) chloride ($MnCl_2$), manganese (II) sulfate ($MnSO_4$), manganese (II) nitrate ($Mn(NO_3)_2$), manganese (II) acetate ($Mn(CH_3COO)_2$), and hydrates thereof. As the Mn source, at least one compound selected from the above-described group is preferably used.

As the P source, for example, at least one compound selected from phosphoric acids such as orthophosphonic acid ($H_3PO_4$) and metaphosphoric acid ($HPO_3$), phosphoric salts such as ammonium dihydrogen phosphate ($NH_4H_2PO_4$), diammonium hydrogen phosphate (($NH_4)_2HPO_4$), ammonium hydrogen phosphate (($NH_4)_3PO_4$), lithium phosphate ($Li_3PO_4$), lithium hydrogen phosphate ($LI_2HPO_4$), and lithium dihydrogen phosphate ($LiH_2PO_4$), and hydrates thereof is preferably used.

An Mg source is preferably an Mg salt, and examples thereof include magnesium (II) chloride ($MgCl_2$), magnesium (II) sulfate ($MgSO_4$), magnesium (II) nitrate ($Mg(NO_3)_2$), magnesium (II) acetate ($Mg(CH_3COO)_2$), and hydrates thereof. As the Mg source, at least one compound selected from the above-described group is preferably used.

A Ca source is preferably a Ca salt, and examples thereof include calcium (II) chloride ($CaCl_2$), calcium (II) sulfate ($CaSO_4$), calcium (II) nitrate ($Ca(NO_3)_2$), calcium (II) acetate ($Ca(CH_3COO)_2$), and hydrates thereof. As the Ca source, at least one compound selected from the above-described group is preferably used.

A Co source is preferably a Co salt, and examples thereof include cobalt (II) chloride ($CoCl_2$), cobalt (II) sulfate ($CoSO_4$), cobalt (II) nitrate ($Co(NO_3)_2$), cobalt (II) acetate ($Co(CH_3COO)_2$), and hydrates thereof. As the Co source, at least one compound selected from the above-described group is preferably used.

An Sr source is preferably an Sr salt, and examples thereof include strontium carbonate ($SrCO_3$), strontium sulfate ($SrSO_4$), and strontium hydroxide ($Sr(OH)_2$), and at least one compound selected from a group made up of the above-described compounds is preferably used.

A Ba source is preferably a Ba salt, and examples thereof include barium (II) chloride ($BaCl_2$), barium (II) sulfate ($BaSO_4$), barium (II) nitrate ($Ba(NO_3)_2$), barium (II) acetate ($Ba(CH_3COO)_2$), and hydrates thereof, and at least one compound selected from a group made up of the above-described compounds is preferably used.

A Ti source is preferably a Ti salt, and examples thereof include titanium chlorides ($TiCl_4$, $TiCl_3$, and $TiCl_2$), titanium oxide (TiO), and hydrates thereof, and at least one compound selected from a group made up of the above-described compounds is preferably used.

A Zn source is preferably a Zn salt, and examples thereof include zinc (II) chloride ($ZnCl_2$), zinc (II) sulfate ($ZnSO_4$), zinc (II) nitrate ($Zn(NO_3)_2$), zinc (II) acetate ($Zn(CH_3COO)_2$), and hydrates thereof. As the Zn source, at least one compound selected from a group made up of the above-described compounds is preferably used.

Examples of a B source include boron compounds such as chlorides, sulfoxides, nitroxides, acetoxides, hydroxides, and oxides, and at least one compound selected from a group made up of the above-described compounds is preferably used.

Examples of an Al source include aluminum compounds such as chlorides, sulfoxides, nitroxides, acetoxides, and hydroxides, and at least one compound selected from a group made up of the above-described compounds is preferably used.

Examples of a Ga source include gallium compounds such as chlorides, sulfoxides, nitroxides, acetoxides, and hydroxides, and at least one compound selected from a group made up of the above-described compounds is preferably used.

Examples of an In source include indium compounds such as chlorides, sulfoxides, nitroxides, acetoxides, and hydroxides, and at least one compound selected from a group made up of the above-described compounds is preferably used.

Examples of an Si source include sodium silicate, potassium silicate, silicon tetrachloride ($SiCl_4$), silicate salts, organic silicon compounds, and the like, and at least one compound selected from a group made up of the above-described compounds is preferably used.

Examples of a Ge source include germanium compounds such as chlorides, sulfoxides, nitroxides, acetoxides, and hydroxides, and at least one compound selected from a group made up of the above-described compounds is preferably used.

Examples of a rare earth element source include chlorides, sulfoxides, nitroxides, acetoxides, hydroxides, oxides, and the like of Sc, Y, La, Ce, Pr, Nd, Pm, Sm, Eu, Gd, Tb, Dy, Ho, Er, Tm, Yb, and Lu, and at least one compound selected from a group made up of the above-described compounds is preferably used.

The solvent including water as a main component is any one of water and water-based solvents which mainly include water and include an aqueous solvent such as an alcohol as necessary.

The aqueous solvent is not particularly limited as long as the solvent is capable of dissolving the Li source, the Fe source, the Mn source, the P source, and the M source. Examples thereof include alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetyl acetone, and cyclohexanone, amides such as dimethyl formamide, N,N-dimethylacetoacetamide, and N-methyl pyrrolidone, glycols such as ethylene glycol, diethylene glycol, and propylene glycol, and the like. These aqueous solvents may be singly used or a mixture of two or more aqueous solvents may be used.

Next, this raw material slurry α is put into a pressure resistant vessel, is heated to a temperature in a range of 150° C. to 230° C. and preferably in a range of 170° C. to 200° C., and is hydrothermally treated for one hour to 72 hours, thereby obtaining $LiFe_xMn_{1-x-y}M_yPO_4$ particles.

The pressure in the pressure resistant vessel reaches, for example, a pressure in a range of 0.1 MPa to 2 MPa when the raw material slurry reaches the temperature in a range of 150° C. to 230° C.

In this case, it is possible to control the particle diameter of the $LiFe_xMn_{1-x-y}M_yPO_4$ particles to a desired size by adjusting the temperature and duration of the hydrothermal treatment.

Next, the $LiFe_xMn_{1-x-y}M_yPO_4$ particles are dispersed in the water solvent including the carbon source, thereby preparing raw material slurry β.

Next, this raw material slurry β is dried and granulated, then, the granulated body is preliminarily calcinated by means of heating at 250° C. so as to be pulverized, and the pulverized body is calcinated at a temperature in a range of 550° C. or higher and 830° C. or lower for one hour or longer and 36 hours or shorter so as to coat the surfaces of the $LiFe_xMn_{1-x-y}M_yPO_4$ particles (primary particles) with the carbonaceous film, thereby obtaining the electrode material for a lithium-ion secondary battery of the present embodiment.

Carbon Source

The carbon source is not limited as long as the carbon source is an organic compound capable of forming a carbonaceous film on the surfaces of the $LiFe_xMn_{1-x-y}M_yPO_4$ particles.

The organic compound is preferably a compound which is soluble in water and dispersible in water. Examples thereof include salicylic acid, catechol, hydroquinone, resorcinol, pyrogallol, phloroglucinol, hexahydroxybenzene, benzoic acid, phthalic acid, terephthalic acid, phenylalanine, water-dispersible phenyl resins, sugars such as sucrose, glucose, and lactose, carboxylic acids such as malic acid and citric acid, unsaturated monovalent alcohols such as allyl alcohol and propargyl alcohol, ascorbic acid, polyvinyl alcohol, and the like, and it is possible to use the organic compound singly or a mixture of two or more organic compounds with the purity of carbon set to 42.00% or more.

In the method for manufacturing an electrode material for a lithium-ion secondary battery of the present embodiment, in a case in which the total mass of the electrode active material and the carbon source is set to 100% by mass, the additive amount (additive rate) of the carbon source is preferably in a range of 0.5% by mass to 15% by mass and more preferably in a range of 1% by mass to 10% by mass.

When the additive amount of the carbon source is less than 0.5% by mass, mixing stability in the electrode material for a lithium-ion secondary battery degrades, which is not preferable. On the other hand, when the additive amount of the carbon source exceeds 15% by mass, the content of the cathode active material becomes relatively small, and battery characteristics degrade, which is not preferable.

Electrode for Lithium-Ion Secondary Battery

An electrode for a lithium-ion secondary battery of the present embodiment includes an electrode current collector and an electrode mixture layer (electrode) formed on the electrode current collector, and the electrode mixture layer includes the electrode material for a lithium-ion secondary battery of the present embodiment.

That is, the electrode for a lithium-ion secondary battery of the present embodiment is obtained by forming the electrode mixture layer on one main surface of the electrode current collector using the electrode material for a lithium-ion secondary battery of the present embodiment.

The electrode for a lithium-ion secondary battery of the present embodiment is mainly used as a cathode for a lithium-ion secondary battery.

A method for manufacturing an electrode for a lithium-ion secondary battery of the present embodiment is not particularly limited as long as an electrode can be formed on one main surface of an electrode current collector using the electrode material for a lithium-ion secondary battery of the present embodiment. Examples of the method for manufacturing an electrode material for a lithium-ion secondary battery of the present embodiment include the following method.

First, an electrode material paste for a lithium-ion secondary battery is prepared by mixing the electrode material for a lithium-ion secondary battery of the present embodiment, a binding agent, a conductive auxiliary agent, and a solvent.

Binding Agent

The binding agent is not particularly limited as long as the binding agent can be used in a water system. Examples thereof include at least one binding agent selected from a group of polyethylene, polypropylene, polyethylene terephthalate, polymethyl methacrylate, vinyl acetate copolymers, styrene/butadiene-based latexes, acrylic latexes, acrylonitrile/butadiene-based latexes, fluorine-based latexes, silicon-based latexes, and the like.

When the total mass of the electrode material for a lithium-ion secondary battery of the present embodiment, the binding agent, and the conductive auxiliary agent is set to 100% by mass, the content rate of the binding agent in the electrode material paste for a lithium-ion secondary battery is preferably in a range of 1% by mass to 10% by mass and more preferably in a range of 2% by mass to 6% by mass.

Conductive Auxiliary Agent

The conductive auxiliary agent is not particularly limited, and, for example, at least one conductive auxiliary agent selected from a group of fibrous carbon such as acetylene black, Ketjen black, furnace black, vapor grown carbon fiber (VGCF), and carbon nanotube.

When the total mass of the electrode material for a lithium-ion secondary battery of the present embodiment, the binding agent, and the conductive auxiliary agent is set to 100% by mass, the content rate of the conductive auxiliary agent in the electrode material paste for a lithium-ion secondary battery is preferably in a range of 1% by mass to 15% by mass and more preferably in a range of 3% by mass to 10% by mass.

Solvent

To the electrode material paste for a lithium-ion secondary battery including the electrode material for a lithium-ion secondary battery of the present embodiment, a solvent may be appropriately added in order to facilitate coating of an article to be coated such as an electrode current collector.

The main solvent is water, but may include a water-based solvent such as an alcohol, a glycol, or an ether as long as the characteristics of the electrode material for a lithium-ion secondary battery of the present embodiment are not lost.

When the total mass of the electrode material for a lithium-ion secondary battery of the present embodiment, the binding agent, and the conductive auxiliary agent is set to 100 parts by mass, the content rate of the solvent in the electrode material paste for a lithium-ion secondary battery is preferably 60 parts by mass or more and 400 parts by mass or less and more preferably 80 parts by mass or more and 300 parts by mass or less.

When the content rate of the solvent is in the above-described range, it is possible to obtain an electrode material paste for a lithium-ion secondary battery having excellent electrode formability and excellent battery characteristics.

A method for mixing the electrode material for a lithium-ion secondary battery of the present embodiment, the binding agent, the conductive auxiliary agent, and the solvent is not particularly limited as long as it is possible to uniformly mix the above-described components. Examples thereof include methods in which a kneader such as a ball mill, a sand mill, a planetary mixer, a paint shaker, or a homogenizer is used.

Next, the electrode material paste for a lithium-ion secondary battery is applied to one main surface of the electrode current collector so as to form a coated film, and the coated film is dried and then pressed under pressure, whereby it is possible to obtain an electrode for a lithium-ion secondary battery including the electrode mixture layer formed on one main surface of the electrode current collector.

Lithium-Ion Secondary Battery

A lithium-ion secondary battery of the present embodiment includes the cathode, an anode, and a non-aqueous electrolyte, and the cathode is the electrode for a lithium-ion secondary battery of the present embodiment.

In the lithium-ion secondary battery of the present embodiment, the anode, the electrolytic solution, the separator, and the like are not particularly limited.

As the anode, it is possible to use, for example, an anode material such as metallic Li, a carbon material, an Li alloy, or $Li_4Ti_5O_{12}$.

In addition, a solid electrolyte may be used instead of the electrolytic solution and the separator.

The electrolytic solution can be produced by, for example, mixing ethylene carbonate (EC) and ethyl methyl carbonate (EMC) so that the volume ratio therebetween reaches 1:1, and dissolving lithium hexafluorophosphate ($LiPF_6$) in the obtained solvent mixture so that the concentration thereof reaches, for example, 1 mol/dm$^3$.

As the separator, it is possible to use, for example, porous propylene.

In the lithium-ion secondary battery of the present embodiment, since the electrode for a lithium-ion secondary battery of the present embodiment is used as the cathode, the lithium-ion secondary battery has a high capacity and a high energy density.

As described above, according to the electrode material for a lithium-ion secondary battery of the present embodiment, since the dispersibility of the electrode active material is high, in a case in which electrodes are produced using this electrode material for a lithium-ion secondary battery, the electrode structure becomes uniform, and thus it is possible to realize high-power lithium-ion secondary batteries.

Since the electrode for a lithium-ion secondary battery of the present embodiment includes the electrode material for a lithium-ion secondary battery of the present embodiment, in the case of being used as cathodes of lithium-ion secondary batteries, it is possible to realize high-power lithium-ion secondary batteries.

Since the lithium-ion secondary battery of the present embodiment includes the electrode for a lithium-ion secondary battery of the present embodiment as the cathode, it is possible to increase the power.

EXAMPLES

Hereinafter, the present invention will be more specifically described using examples and comparative examples, but the present invention is not limited to the following examples.

Example 1

Synthesis of Electrode Material lithium acetate ($LiCH_3COO$) (4 mol), iron (II) sulfate ($FeSO_4$) (2 mol), and phosphoric acid ($H_3PO_4$) (2 mol) were mixed with water (2 L (liters)) so that the total amount reached 4 L (liters), thereby preparing a homogeneous slurry-form mixture.

Next, this mixture was stored in a pressure-resistant airtight container having a capacity of 8 L (liters) and was hydrothermally synthesized at 120° C. for one hour, thereby generating a precipitate.

Next, this precipitate was cleaned with water, thereby obtaining a cake-form precursor of an electrode active material.

Next, an aqueous solution obtained by dissolving glucose (20 g) in water (100 g) and zirconia beads having a diameter of 0.1 mm (250 g) as medium particles were mixed with the precursor of an electrode active material (75 g in terms of solid content), and a dispersion treatment was carried out using a ball mill for one hour, thereby preparing a homogeneous slurry.

Next, the obtained slurry (50 parts by mass) was sprayed in the atmosphere at 180° C., dried, and granulated, thereby obtaining a granulated body (dried body).

Next, the granulated body was preliminarily calcinated in a nitrogen atmosphere for 0.5 hours at 250° C., the obtained precursor was pulverized using a jet mill at a treatment amount of 100 kg/h and was then calcinated for one hour at 800° C., and the obtained calcinated powder was used as an electrode material of Example 1.

Production of Lithium-Ion Secondary Battery

The electrode material of Example 1, polyvinylidene fluoride (PVdF) as a binding agent, and acetylene black (AB) as a conductive auxiliary agent were added to N-methyl-2-pyrrolidone (NMP) which was a solvent so that the mass ratio therebetween (the electrode material of Example 1:AB:PVdF) in paste reached 90:5:5, and the components were mixed together, thereby preparing electrode material paste (for an cathode).

Next, the electrode material paste (for an cathode) was applied to the surface of a 30 µm-thick aluminum foil (electrode current collector) so as to form a coated film, and the coated film was dried, thereby forming a cathode mixture layer on the surface of the aluminum foil. The thickness of the cathode mixture layer was adjusted so that the capacity ratio between a cathode and an anode reached 1.2 (the cathode/the anode).

After that, the cathode mixture layer was pressed under a predetermined pressure so that the cathode density reached 2.0 g/mL, and a square specimen having a cathode area of 9 cm$^2$ was produced using a shaping machine by means of punching, thereby producing a cathode of Example 1.

Next, $Li_4Ti_5O_{12}$ as an anode active material, carbon black (CB) as a conductive auxiliary agent, and carboxymethyl cellulose (CMC) as a binding agent and a viscosity adjuster were added to pure water which was a solvent so that the mass ratio therebetween ($Li_4Ti_5O_{12}$:CB:CMC) in paste reached 95:2:3, and the components were mixed together, thereby preparing anode material paste (for an anode).

Next, the anode material paste (for an anode) was applied to the surface of a 10 µm-thick copper foil (electrode current collector) so as to form a coated film, and the coated film was dried, thereby forming an anode mixture layer on the surface of the copper foil. The coating thickness was adjusted so that the coating weight of the anode mixture layer reached 10 mg/cm$^2$. After the anode mixture layer was pressed under a predetermined pressure so that the anode density reached 1.48 g/mL, and a square specimen having an anode area of 9.6 cm$^2$ was produced using a shaping machine by means of punching, thereby producing an anode of Example 1.

The cathode and the anode were made to face each other through a 25 µm-thick polypropylene separator, were immersed in a 1 M LiPF$_6$ solution (0.5 mL) as an electrolytic solution, and then were sealed with a laminate film, thereby producing a lithium-ion secondary battery of Example 1. As the LiPF$_6$ solution, a solution obtained by mixing ethylene carbonate and ethyl methyl carbonate so that the volume ratio reached 1:1 was used.

Example 2

Synthesis of Electrode Material

An electrode material of Example 2 was obtained in the same manner as in Example 1 except for the fact that the treatment amount by the jet mill was set to 150 kg/h.

Production of Lithium-Ion Secondary Battery

A lithium-ion secondary battery of Example 2 was produced in the same manner as in Example 1 except for the fact that the electrode material of Example 2 was used.

Example 3

Synthesis of Electrode Material

An electrode material of Example 3 was obtained in the same manner as in Example 1 except for the fact that the amount of glucose added was set to 25 g and the treatment amount by the jet mill was set to 90 kg/h.

Production of Lithium-Ion Secondary Battery

A lithium-ion secondary battery of Example 3 was produced in the same manner as in Example 1 except for the fact that the electrode material of Example 3 was used.

Example 4

Synthesis of Electrode Material

An electrode material of Example 4 was obtained in the same manner as in Example 1 except for the fact that the amount of glucose added was set to 40 g.

Production of Lithium-Ion Secondary Battery

A lithium-ion secondary battery of Example 4 was produced in the same manner as in Example 1 except for the fact that the electrode material of Example 4 was used.

Comparative Example 1

Synthesis of Electrode Material

An electrode material of Comparative Example 1 was obtained in the same manner as in Example 1 except for the fact that the treatment amount by the jet mill was set to 50 kg/h.

Production of Lithium-Ion Secondary Battery

A lithium-ion secondary battery of Comparative Example 1 was produced in the same manner as in Example 1 except for the fact that the electrode material of Comparative Example 1 was used.

Comparative Example 2

Synthesis of Electrode Material

An electrode material of Comparative Example 2 was obtained in the same manner as in Example 1 except for the fact that the treatment amount by the jet mill was set to 200 kg/h.

Production of Lithium-Ion Secondary Battery

A lithium-ion secondary battery of Comparative Example 2 was produced in the same manner as in Example 1 except for the fact that the electrode material of Comparative Example 2 was used.

Comparative Example 3

Synthesis of Electrode Material

An electrode material of Comparative Example 3 was obtained in the same manner as in Example 1 except for the fact that the amount of glucose added was set to 5 g.

Production of Lithium-Ion Secondary Battery

A lithium-ion secondary battery of Comparative Example 3 was produced in the same manner as in Example 1 except for the fact that the electrode material of Comparative Example 3 was used.

Comparative Example 4

Synthesis of Electrode Material

An electrode material of Comparative Example 4 was obtained in the same manner as in Example 1 except for the fact that the amount of glucose added was set to 80 g.

Production of Lithium-Ion Secondary Battery

A lithium-ion secondary battery of Comparative Example 4 was produced in the same manner as in Example 1 except for the fact that the electrode material of Comparative Example 4 was used.

Evaluation of Electrode Materials for Lithium-Ion Secondary Battery

1. Specific Surface Area

The specific surface areas of the electrode materials for a lithium-ion secondary battery of Examples 1 to 4 and Comparative Examples 1 to 4 were measured using a specific surface area meter (tradename: BELsorp-mini II, manufactured by MicrotracBEL Corp.) and a BET method in which nitrogen (N$_2$) adsorption was used. The results are shown in Table 1.

2. Amount of Carbon

The amounts of carbon in the electrode materials for a lithium-ion secondary battery of Examples 1 to 4 and Comparative Examples 1 to 4 were measured using a carbon/sulfur analyzer (trade name: EMIA-920V, manufactured by Horiba Ltd.). The results are shown in Table 1.

3. Particle Size Distribution

For the electrode materials for a lithium-ion secondary battery of Examples 1 to 4 and Comparative Examples 1 to 4, the particle size distributions were measured using a laser diffraction and scattering particle size distribution analyzer (serial No.: LA-950V2, manufactured by Horiba, Ltd.), and the particle diameters (D90) at which the cumulative volume percentage of the particle size distribution of the electrode material for a lithium-ion secondary battery was 90% before an ultrasonic treatment and after the ultrasonic treatment were obtained.

In addition, the ratio of the particle diameter (D90) after the ultrasonic treatment to the particle diameter (D90) before the ultrasonic treatment was computed from the obtained values of the particle diameters (D90) at which the cumulative volume percentage of the particle size distribution of the electrode material for a lithium-ion secondary battery was 90% before an ultrasonic treatment and after the ultrasonic treatment. The results are shown in Table 1.

The ultrasonic treatment for the electrode materials for a lithium-ion secondary battery of Examples 1 to 4 and Comparative Examples 1 to 4 was carried out using the following method.

The ultrasonic treatment was carried out in an ultrasonic dispersion step in a circulation system of the laser diffraction and scattering particle size distribution analyzer LA-950V2 manufactured by Horiba Ltd. The ultrasonic intensity was controlled using software, and the ultrasonic treatment was carried out with the intensity, which could be set in a range of 0 to 7, set to 7 (the power: 30 W, the frequency: 20 kHz, and the ultrasonic treatment time: 20 seconds excluding the time for the particle size distribution measurement). The particle size distribution was measured with water (50 g) as a solvent and the sample (1 mg) injected into the sample injection opening.

4. Traverse Relaxation Time Measured Using Nuclear Magnetic Resonance Method

The electrode materials for a lithium-ion secondary battery (0.01 g) of Examples 1 to 4 and Comparative Examples 1 to 4 were weighed in a screw tube having a capacity of 30 mL, N-methyl-2-pyrrolidone (10 g) was added thereto, and then an ultrasonic treatment was carried out for five minutes using an ultrasonic cleaning machine, thereby preparing dispersion liquids including the electrode materials for a lithium-ion secondary battery. The obtained dispersion liquids were collected into NMR tubes, and the traverse relaxation times of the electrode materials for a lithium-ion secondary battery were measured using a nuclear magnetic resonance device (trade name: Acorn Area, manufactured by Xigo Nanotools). The results are shown in Table 1.

Evaluation of Lithium-Ion Secondary Battery

1. Battery Characteristics

For the lithium-ion secondary batteries of Examples 1 to 4 and Comparative Examples 1 to 4, at an ambient temperature of 25° C., constant electric current charging was carried out at a current value of 0.1 C until the voltage of the cathode reached 2.2V relative to the equilibrium voltage of LTO, then, the charging was switched to constant-voltage charging, and the charging was finished when the current value reached 0.01 A. After that, discharging was carried out at a current value of 0.1 C and was finished when the battery voltage reached 1.0 V. The above-described charge and discharge process was considered as one cycle, and 0.1 C charging and discharging was carried out three cycles under the same conditions.

After that, the conditions were changed to charge and discharge at a current value of 10 C, and the discharge capacity at the first cycle after the change was measured and considered as the 10 C discharge capacity. The results are shown in Table 1.

In the lithium-ion secondary batteries of Examples 1 to 4 and Comparative Examples 1 to 4, 10 C discharge capacities of 80 mAh/g or more were evaluated as favorable.

TABLE 1

|   | Specific surface area [m²/g] | Amount of carbon [% by mass] | (1) Particle diameter (D90) before ultrasonic treatment [μm] | (2) Particle diameter (D90) after ultrasonic treatment [μm] | (2)/(1) | Traverse relaxation time [ms] | 10 C discharge capacity (25° C.) [mAh/g] |
|---|---|---|---|---|---|---|---|
| Example 1 | 12.9 | 0.93 | 30.2 | 11.4 | 0.38 | 61 | 87 |
| Example 2 | 10.8 | 0.97 | 29.4 | 11.3 | 0.38 | 71 | 90 |
| Example 3 | 13.5 | 1.52 | 33.1 | 11.5 | 0.35 | 52 | 88 |
| Example 4 | 16.0 | 2.27 | 25.2 | 10.1 | 0.40 | 200 | 85 |
| Comparative Example 1 | 14.9 | 0.99 | 19.8 | 11.6 | 0.59 | 48 | 61 |
| Comparative Example 2 | 9.2 | 0.88 | 50.3 | 13.0 | 0.26 | 110 | 70 |
| Comparative Example 3 | 8.3 | 0.42 | 32.8 | 13.3 | 0.41 | 37 | 44 |
| Comparative Example 4 | 24.0 | 3.19 | 27.8 | 12.4 | 0.45 | 478 | 68 |

The results of Table 1 show that, in the electrode materials for a lithium-ion secondary battery of Examples 1 to 4, the specific surface areas, the amounts of carbon, the particle diameters (D90) at which the cumulative volume percentage of the particle size distribution of the electrode material for a lithium-ion secondary battery was 90% before and after the ultrasonic treatment, and the ratios of the particle diameter (D90) after the ultrasonic treatment to the particle diameter (D90) before the ultrasonic treatment were in the ranges defined by the present invention, and thus the 10 C discharge capacities of the lithium-ion secondary batteries were 85 mAh/g or more.

On the other hand, in the electrode material for a lithium-ion secondary battery of Comparative Example 1, the particle diameter (D90) at which the cumulative volume percentage of the particle size distribution of the electrode material for a lithium-ion secondary battery was 90% before the ultrasonic treatment was below the lower limit of the range defined by the present invention, and the ratio of the particle diameter (D90) after the ultrasonic treatment to the particle diameter (D90) before the ultrasonic treatment exceeded the upper limit of the range defined by the present invention, and thus the 10 C discharge capacity of the lithium-ion secondary battery was 61 mAh/g or more.

In the electrode material for a lithium-ion secondary battery of Comparative Example 2, the specific surface area was below the lower limit of the range defined by the present invention, the particle diameter (D90) at which the cumulative volume percentage of the particle size distribution of the electrode material for a lithium-ion secondary battery was 90% before the ultrasonic treatment exceeded the upper limit of the range defined by the present invention, and the ratio of the particle diameter (D90) after the ultrasonic treatment to the particle diameter (D90) before the ultrasonic treatment was below the lower limit of the range defined by the present invention, and thus the 10 C discharge capacity of the lithium-ion secondary battery was 70 mAh/g or more.

In the electrode material for a lithium-ion secondary battery of Comparative Example 3, the specific surface area was below the lower limit of the range defined by the present invention, and the amount of carbon was below the lower limit of the range defined by the present invention, and thus the 10 C discharge capacity of the lithium-ion secondary battery was 44 mAh/g or more.

In the electrode material for a lithium-ion secondary battery of Comparative Example 4, the specific surface area exceeded the upper limit of the range defined by the present invention, and the amount of carbon exceeded the upper limit of the range defined by the present invention, and thus the 10 C discharge capacity of the lithium-ion secondary battery was 68 mAh/g or more.

Since the electrode material for a lithium-ion secondary battery of the present invention is secondary particles including inorganic particles represented by General Formula $LiFe_xMn_{1-x-y}M_yPO_4$ (here, M represents at least one element selected from Mg, Ca, Co, Sr, Ba, Ti, Zn, B, Al, Ga, In, Si, Ge, and rare earth elements, $0.05 \leq x \leq 1.0$, $0 \leq y \leq 0.14$, and $0 \leq 1-x-y$) and a carbonaceous film that coats the surfaces of the inorganic particles, in which the amount of carbon is 0.5% by mass or more and 2.5% by mass or less, the specific surface area is 10 $m^2/g$ or more and 20 $m^2/g$ or less, the first particle diameter (D90(a)) at which the cumulative volume percentage of the particle size distribution of secondary particles is 90% before an ultrasonic treatment is 20 μm or more and 40 μm or less, the second particle diameter (D90(b)) at which the cumulative volume percentage of the particle size distribution of the secondary particles is 90% after the ultrasonic treatment is 10 μm or more and 15 μm or less, and the ratio (D90(b)/D90(a)) of the second particle diameter (D90(b)) to the first particle diameter (D90(a)) is 0.3 or more and 0.5 or less, lithium-ion secondary batteries including an electrode for a lithium-ion secondary battery produced using this electrode material for a lithium-ion secondary battery have a high discharge capacity and thus can also be applied to next-generation secondary batteries that are expected to have a higher voltage, a higher energy density, higher load characteristics, and higher-speed charge and discharge characteristics, and, in the case of next-generation secondary batteries, the effects are extremely great.

What is claimed is:

1. An electrode material for a lithium-ion secondary battery which is secondary particles including: inorganic particles represented by General Formula $LiFe_xMn_{1-x-y}M_yPO_4$, wherein M represents at least one element selected from Mg, Ca, Co, Sr, Ba, Ti, Zn, B, Al, Ga, In, Si, Ge, and rare earth elements, $0.05 \leq x \leq 1.0$, $0 \leq y \leq 0.14$, and $0 \leq 1-x-y$; and a carbonaceous film that coats surfaces of the inorganic particles,
   wherein an amount of carbon is 0.5% by mass to 2.5% by mass,
   a specific surface area is 10 $m^2/g$ to 20 $m^2/g$,
   a first particle diameter (D90(a)) at which a cumulative volume percentage of a particle size distribution of secondary particles is 90% before an ultrasonic treatment is 20 μm to 40 μm,
   a second particle diameter (D90(b)) at which the cumulative volume percentage of the particle size distribution of the secondary particles is 90% after the ultrasonic treatment is 10 μm to 15 μm,
   a ratio (D90(b)/D90(a)) of the second particle diameter (D90(b)) to the first particle diameter (D90(a)) is 0.3 to 0.5 and
   the ultrasonic treatment is carried out by a following method under a condition of the ultrasonic treatment shown below:
   the ultrasonic treatment is carried out in an ultrasonic dispersion step in a circulation system of a laser diffraction and scattering particle size distribution analyzer LA-950V2 manufactured by Horiba Ltd;
   wherein an ultrasonic intensity in the step is controlled using a software, the ultrasonic treatment is carried out with an intensity, wherein an intensity of the analyzer is capable of setting in a range of 0 to 7, set to 7, a power is set to 30 W, a frequency is set to 20 kHz, and a ultrasonic treatment time is set to 20 seconds excluding a time for a particle size distribution measurement: and the particle size distribution is measured with 50 g of water and the 1 mg of secondary particles injected into a sample injection opening.

2. The electrode material for a lithium-ion secondary battery according to claim 1,
   wherein N-methyl-2-pyrrolidone is used as a solvent, and a traverse relaxation time measured using a nuclear magnetic resonance method is 40 ms to 400 ms, and the traverse relaxation time is measured by a following method under a condition shown below: 0.01 g of the electrode material for a lithium-ion secondary battery is weighed in a screw tube having a capacity of 30 mL, 10 g of N-methyl-2-pyrrolidone is added to the screw tube, and then an ultrasonic treatment is carried out for five minutes using an ultrasonic cleaning machine, thereby preparing a dispersion liquid including the electrode material for a lithium-ion secondary battery; the dispersion liquid is collected into an NMR tube, and the traverse relaxation time of the electrode material for a lithium-ion secondary battery is measured using a nuclear magnetic resonance device.

3. An electrode for a lithium-ion secondary battery comprising:
   the electrode material for a lithium-ion secondary battery according to claim 1.

4. A lithium-ion secondary battery comprising:
   a cathode;
   an anode; and
   a non-aqueous electrolyte,
   wherein the cathode is the electrode for a lithium-ion secondary battery according to claim 3.

5. A method for manufacturing the electrode material for a lithium-ion secondary battery according to claim 1, the method comprising:
   a step of synthesizing $LiFe_xMn_{1-x-y}M_yPO_4$ particles under pressure by heating raw material slurry α obtained by mixing an Li source, a Fe source, an Mn source, a P source, and an M source with a solvent including water as a main component; and
   a step of coating surfaces of the $LiFe_xMn_{1-x-y}M_yPO_4$ particles with a carbonaceous film by drying raw material slurry β formed by dispersing the $LiFe_xMn_{1-x-y}M_yPO_4$ particles in a water solvent including a carbon source so as to granulate the slurry, then, preliminarily calcinating the granulated body so as to pulverize the granulated body, and then heating the pulverized body.

* * * * *